Patented Sept. 26, 1922.

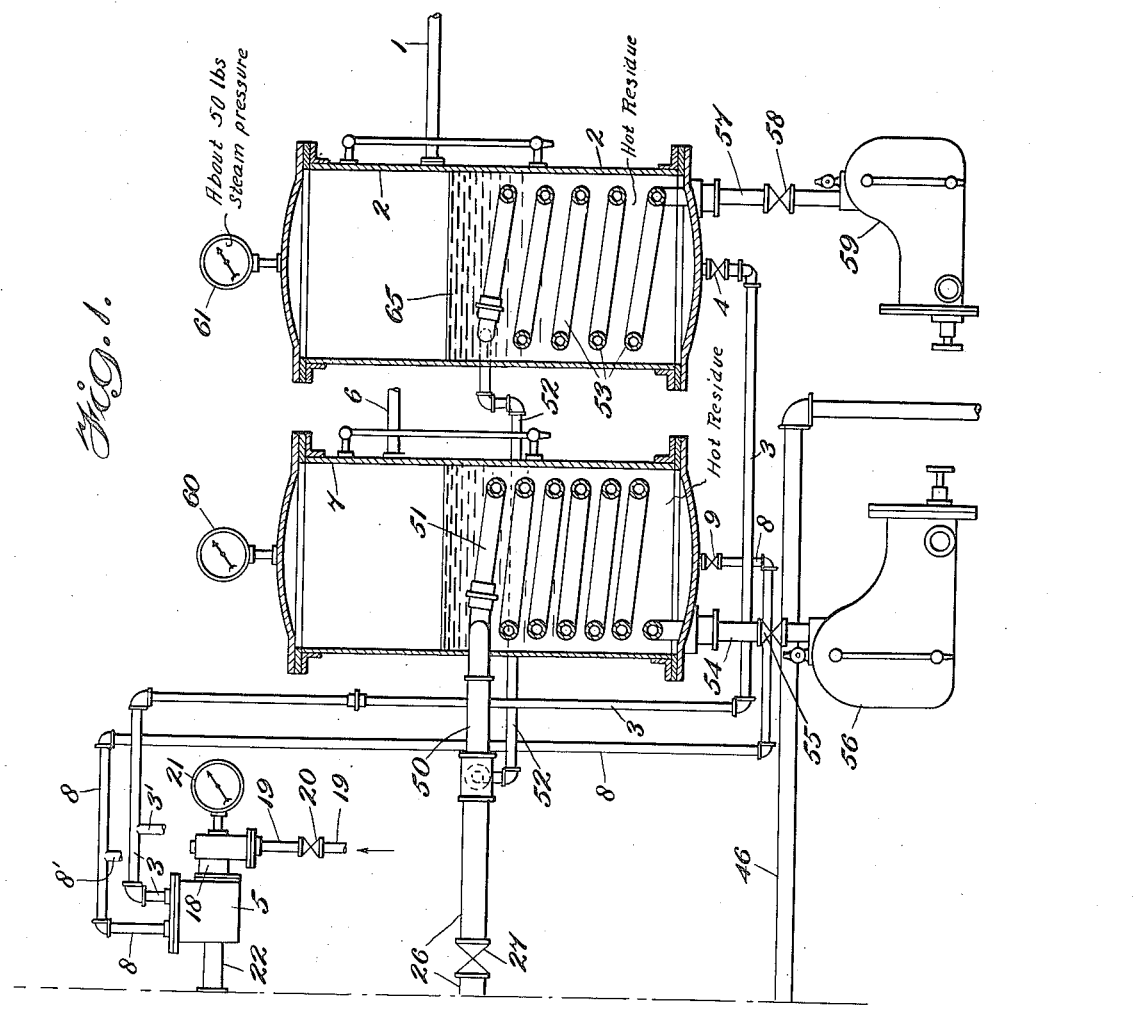

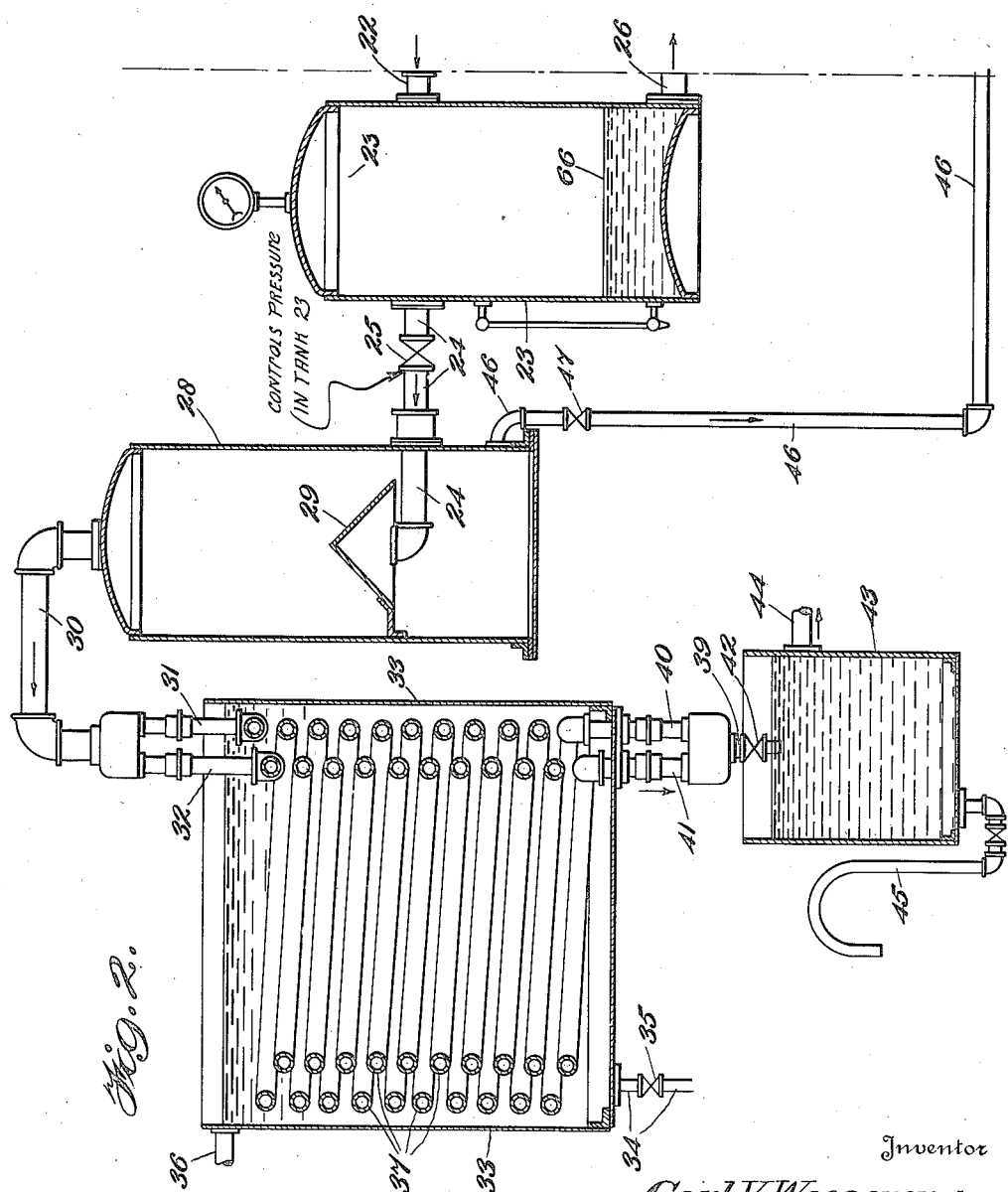

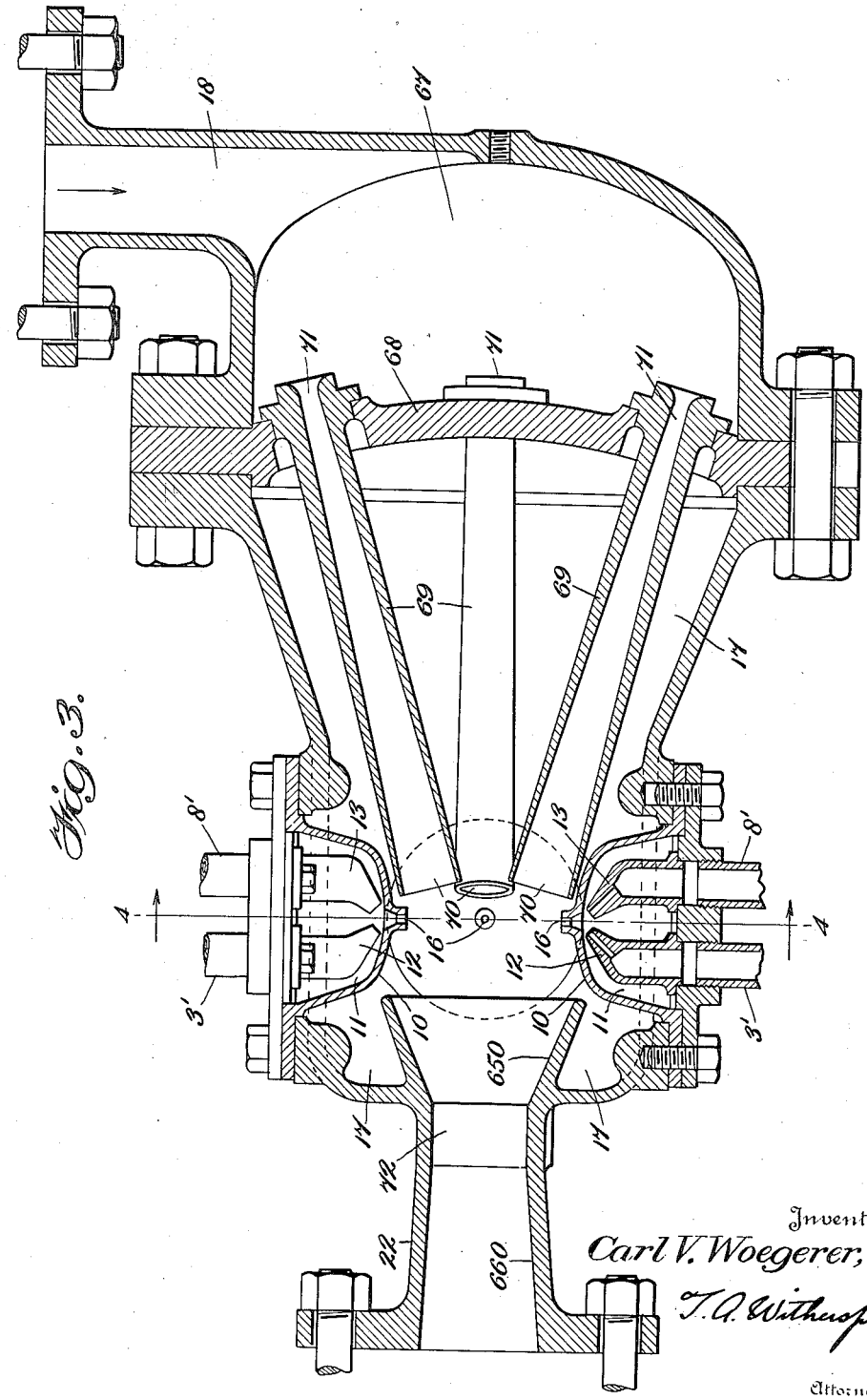

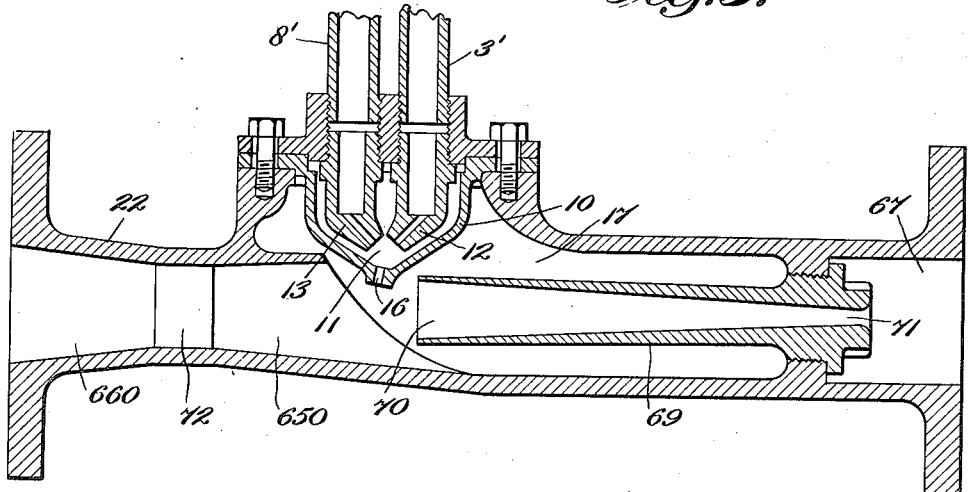
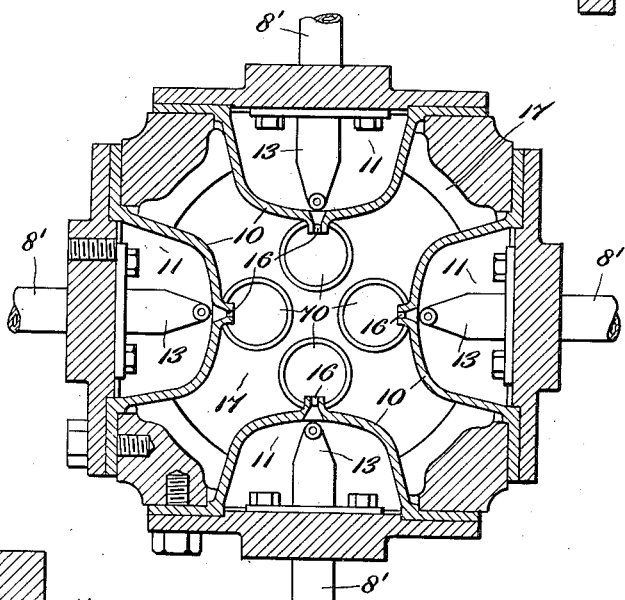
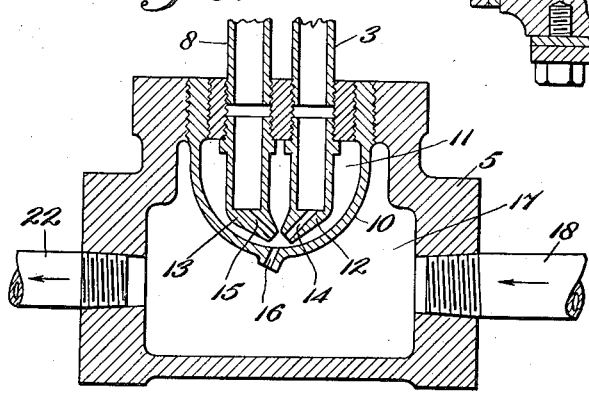

1,429,992

UNITED STATES PATENT OFFICE.

CARL V. WOEGERER, OF NEW YORK, N. Y., ASSIGNOR OF ONE-HALF TO JAMES R. CLARKE AND ONE-HALF TO WILLIAM H. CLARKE, BOTH OF NEW YORK, N. Y.

PROCESS OF AND APPARATUS FOR PRODUCING LIGHTER HYDROCARBONS FROM HEAVIER HYDROCARBONS.

Application filed May 8, 1920. Serial No. 379,960.

*To all whom it may concern:*

Be it known that I, CARL V. WOEGERER, a citizen of the United States, residing at New York city, in the county of New York and State of New York, have invented certain new and useful Improvements in Processes of and Apparatus for Producing Lighter Hydrocarbons from Heavier Hydrocarbons; and I do hereby declare the following to be a full, clear, and exact description of the invention, such as will enable others skilled in the art to which it appertains to make and use the same.

This invention relates to a process of and an apparatus for producing lighter hydrocarbons from heavier hydrocarbon oils, and has for its object to provide a method and means which will be more efficient in practice and less costly to construct than those heretofore proposed.

With these and other objects in view, the invention consists in the novel steps and combinations of steps constituting the process, and in the novel parts and combinations of parts constituting the apparatus, all as will be more fully hereinafter disclosed and particularly pointed out in the claims.

Referring to the accompanying drawings forming a part of this specification, in which like numerals designate like parts in all the views:—

Figure 1 is a sectional view of a portion of an apparatus suitable for carrying out this invention;

Figure 2 is a sectional view of the remaining portion of the said apparatus;

Figure 3, is an enlarged sectional view of one form of atomizer suitable for use in said apparatus;

Figure 4 is a sectional view on the line 4—4 of Figure 3;

Figure 5 is a sectional view of a modified form of atomizer; and

Figure 6 is a sectional view of a still further modified form of atomizer.

1 indicates any suitable supply of a relatively heavy hydrocarbon oil, such for example as kerosene, or a heavier oil, from which a lighter product is to be derived, 2 represents a tank or receptacle into which pipe 1 leads, 3 a pipe provided with a valve 4 leading from tank 2 to the atomizer 5, 6 any suitable supply of a catalyzing, or contact substance, such, for example, as a mixture of water and lime. 7 represents a tank into which the pipe 6 leads, and 8 represents a pipe provided with the valve 9 leading from the tank 7 to the said atomizer 5. Said atomizer 5 may be of a variety of constructions, one of which is shown, in the modified form illustrated in Figure 6, wherein there is provided a diaphragm, or partition 10, forming a chamber 11 into which deliver the nozzles 12 and 13 respectively attached to the pipes 3 and 8. Said atomizing nozzles 12 and 13, further, have their orifices 14 and 15 inclined toward each other, and said partition is provided with an opening 16 near said orifices as shown.

The arrangement is such that oil coming through the orifice 14 under pressure will meet a jet of mixed water, and calcium hydrate from the orifice 15, whereupon, a severe churning action under a considerable pressure will take place in chamber 11, with the result that the lime and calcium hydrate present will be brought into the most intimate contact with finely divided particles of oil before the mixture finds its way through orifice 16 into the larger chamber 17, with which the atomizer 5 is also provided.

Said atomizer is provided with the pipe 18 communicating with a steam supply pipe 19 having a valve 20 and a pressure gage 21, as well as with a delivery pipe 22, which leads to the tank 23, Figure 2, provided with the pipe 24 having valve 25, as well as with the draw off pipe 26 having the valve 27, as shown. The pipe 24 delivers into the tank 28 preferably against the baffles 29, and leading from said tank 28 is the pipe 30 joined to the condenser pipes 31 and 32. The condenser 33 is provided with an inlet 34, having a valve 35, an outlet 36, and a condensing coil 37, joined to the pipe 39 as by the connections 40 and 41. Said pipe 39 is provided with a valve 42, and delivers into the tank 43 having the outlets 44 and 45.

Said tank 28 in addition to the pipe 30 is provided with the pipe 46 having the valve 47, and said pipe 26 is provided with a branch pipe 50 leading to the preheating coil 51 in the tank 7, and with another branch pipe 52 leading to the preheating coil 53 in the tank 2. From the coil 51 leads the pipe 54 having the valve 55, to the trap 56, and from the coil 53 leads the pipe 57 having the valve 58 to the trap 59. 60 and 61 represent pressure gages.

The operation of this invention so far as has now been disclosed is as follows:—

A relatively heavy hydrocarbon oil such, for example, as kerosene, or a heavier hydrocarbon, is conveniently pumped through pipe 1 into oil tank 2, whence it is conveyed under pressure through pipe 3 to the mixing chamber 11 in the particular atomizer used. At the same time a mixture of lime and water if a catalyzer is used is brought into what may be termed the catalyzer tank 7, whence it is conveyed under pressure through a pipe 8 also to said chamber 11. The oil being forced into said chamber in the form of a jet from nozzle 12, where it meets a jet of calcium hydrate and water from nozzle 13, it is evident that a most thorough mixing of the oil, water and calcium hydrate takes place in said chamber 11 before the action of steam is had. I have found in practice it is very desirable to thus preliminarily mix the catalyst and oil, before employing the steam, instead of pumping a mixture of oil and lime directly to atomizer chamber 17 and then admitting the steam, for I find much better yields of gasolene to result.

The chamber 11 is limited in capacity, and, therefore, the mixed oil, water, and lime is almost immediately passed through orifice 16 into chamber 17 where it meets live steam from pipe 18. The temperature of said steam is preferably maintained at about 250° F., or at say from 220° F. to 280° F., which are temperatures well below 500° F.; 400° F.; or 350° F., and a considerable back pressure of say from 15 to 50 pounds is maintained in the atomizer 5 as well as in the tank 23 which is a pressure well below 100 pounds, and which is found to further greatly increase the production of lighter hydrocarbons from the kerosene or other heavier oils employed.

The steam, oil, and calcium hydrate, is now passed through pipe 22 into the pressure or separating tank 23, where a considerable portion 66 of unconverted oil and lime will settle out. This unconverted mixture is conveniently led through pipes 26, 50 and 52 to the coils 51 and 53, and thence into the traps 56 and 59, and may be used over again.

The tank 23, above said mixture 66, however, will contain a volatile mixture of hydrocarbons under the back pressure mentioned, and at a corresponding temperature; so that said mixture readily passes on into the settling tank 28 through pipe 24, where a considerable portion of the steam and water present, as well as some unconverted oil and some lime will settle out, and the latter may be drawn off through the pipe 46. The baffle 29 against which the mixture impinges facilitates this settling action, while it permits the hot and lighter hydrocarbons to rise and pass out the pipe 30, to and through, the condenser 33 where the pressure falls to say 10 or 15 pounds. The cooled and condensed mixture of hydrocarbons now passes through the pipe 39 into the collecting tank 43, where any heavier hydrocarbons and water that may be present will collect at the bottom and may be drawn off through valved pipe 45; and where a very large percentage of lighter hydrocarbons will collect at the top and may be drawn off through the pipe 44.

It is a most important feature of this invention that the chamber 11 is provided in all the forms of atomizers, for, I find in practice that the efficiency of the process is so enhanced by the churning action taking place in said chamber that in many cases I can get almost as good results with steam alone, as I can with steam and a catalyst, and in all cases I can attain results by using said chamber which are far superior to those attainable by the steam distillation processes heretofore known, as will presently appear.

That is to say, the preferred form of atomizing nozzle is illustrated in Figures 3 and 4, wherein there is employed a plurality of chambers 11, a plurality of diaphragms 10, and a plurality of nozzles 12 and 13, conveniently derived respectively from the branches 3' and 8' with which the pipes 3 and 8 are respectively provided as indicated in Figure 1.

In this said preferred form of atomizing nozzle, I flare the end 650 of pipe 27 inside the chamber 17, and also the end or bore 660, as it leaves said chamber, all as will be clear from Figure 3. The pipe 18 opens into a chamber 67 separated from the chamber 17 by the partition or diaphragm 68, through which pass a plurality of pipes or nozzles 69, having the flared or expanding bores 70 as shown.

It will now be clear that the oil and calcium hydrate if lime be used, or the oil and water, or steam, if no catalyst be used, will first be thoroughly mixed or atomized in each of the chambers 11, whereupon the mixtures will issue in the form of jets through the orifices 16 into the chamber 17, while steam collected in the chamber 67 will pass through the restricted orifices 71 of the bores 70. Said steam gains velocity as it expands along the said bores 70, and sweeps out of the chamber 17 the already thoroughly atomized oil into the restricted orifice 72 of the pipe 22, whereon the mixture expands in the bore 660 and in the tank 23, thus liberating light hydrocarbons in the manner above disclosed.

In practice I have employed well known atomizing nozzles, and have repeatedly taken well known brands of kerosene oil in 15 gallon lots and treated them with steam in the manner above outlined, but without using any lime or other contact substance, and have thus obtained when using a well known type of nozzle, from a pure steam distillation process, the well known fractions of lighter hydrocarbons that were contained in the original soil.

On the other hand, when precisely this same process was carried out with the type of nozzle now disclosed the yields of lighter hydrocarbons were very greatly improved.

I have then repeatedly, without changing the process at all, except to add say 6 pounds of lime or other finely divided substance, subjected the same oil in the same quantities to the exact process above outlined, with ordinary atomizing nozzles, and have obtained additional quantities of lighter hydrocarbons over the pure steam distillation process with ordinary forms of nozzles.

But again, when my form of nozzle was employed in carrying out this same process with lime, I found the yields of lighter hydrocarbons far superior to what had been heretofore obtainable.

In the modified form of apparatus shown in Figure 5, the principle is the same as in the preceding figures, and the structure is substantially the same as in Figure 3, except there are fewer atomizing chambers 11.

It will now be clear that in all the forms I provide an atomizing nozzle which thoroughly atomizes the oil in one or more chambers 11, before the steam in chamber 17 acts upon it, and that this sequence of actions has been found in practice to greatly improve the yields of lighter hydrocarbons from the heavier hydrocarbons treated. It will further be observed that the maintenance of a back pressure of from say 15 to 50 pounds in the tank 23 probably serves to keep the temperature more uniform, or at from say 220° F. to 280° F., and also to secure a more even flow of the vapors from said tank through the apparatus. Especially is the maintenance of a small pressure of say from 10 to 15 pounds in the condenser very useful in enhancing the yields of lighter hydrocarbons.

This process and apparatus possesses great advantages in its being continuous, in its being carried out at relatively low temperatures, in its inexpensive apparatus, in its quickness of action, its higher yields, and in many other respects not necessary to mention.

It is obvious that those skilled in the art may vary the details of the process as well as the apparatus without departing from the spirit of the invention, and therefore I do not wish to be limited to the above disclosure except as may be required by the claims.

What I claim is:—

1. The process of producing hydrocarbons of a less specific gravity from hydrocarbons of a higher specific gravity which consists in subjecting said last named hydrocarbons to an atomizing action with water and lime; then to an atomizing action of steam under pressure and at a temperature below 500° F.; then to a settling action under a pressure maintained above that of the atmosphere to separate out a portion of the unconverted oil and lime present; and finally to a condensing action under superatmospheric pressure, substantially as described.

2. The process of producing hydrocarbons of a less specific gravity from hydrocarbons of a higher specific gravity which consists in subjecting a plurality of portions of said last named hydrocarbons to an atomizing action of water and lime; then to an atomizing action of steam under pressure and at a temperature below 400° F.; then to a settling action under a pressure maintained above that of the atmosphere and below 100 pounds; and finally to a condensing action under super-atmospheric pressure, substantially as described.

3. The process of producing hydrocarbons of a less specific gravity from hydrocarbons of a higher specific gravity which consists in subjecting said last named hydrocarbons to an atomizing action of water and a catalyst in a chamber, and then to the action of steam under pressure at a temperature below 350° F. in another chamber to produce said first mentioned hydrocarbons; and recovering the latter from the residue, substantially as described.

4. The process of producing lighter hydrocarbons from heavier hydrocarbons which consists in subjecting said heavier hydrocarbons to the atomizing action of a catalyst comprising lime in a chamber; then subjecting the resulting mixture to the action of steam under pressure in another chamber to produce said lighter hydrocarbons; and separating the latter from the residue, substantially as described.

5. The process of producing lighter hydrocarbons from heavier hydrocarbons which consists in adding water and lime to said heavier hydrocarbons by subjecting the latter to an atomizing action in a chamber; subjecting the resulting mixture to the action of steam under pressure in another chamber; maintaining a back pressure on said mixture until said lighter hydrocarbons are evolved; and separating out said lighter hydrocarbons, substantially as described.

6. The process of producing lighter hydrocarbons from kerosene and the like which consists in adding to the latter a catalyst while subjecting the mixture to an atomizing action in a chamber, and then to the action of steam in another chamber at a temperature below 350° F.; maintaining a back pressure on said mixture to evolve said lighter hydrocarbons; separating said lighter hydrocarbons from the residue; and condensing the latter under super-atmospheric pressure, substantially as described.

7. The continuous process of producing lighter hydrocarbons from heavier hydrocarbons which consists in subjecting a plurality of portions of said heavier hydrocarbons to the atomizing action of hydrated lime in separate chambers; then continuously subjecting the mixture of said portions in another chamber to the action of steam under a pressure sufficient to produce a substantial percentage of said lighter hydrocarbons from said heavier hydrocarbons; maintaining a back pressure on the steam treated mixture; and separating out said lighter hydrocarbons, substantially as described.

8. In an apparatus for producing lighter hydrocarbons from heavier hydrocarbons, the combination of a receptacle for containing a catalyst; a second receptacle for containing said heavier hydrocarbons; a collecting tank; an atomizer provided with a plurality of communicating chambers; connections between said first named receptacle and said atomizer; connections between said second named receptacle and said atomizer; connections between said atomizer and said tank; nozzles for mixing said hydrocarbons and said catalyst in one of said chambers; a steam pipe joined to another of said chambers; and means comprising a condenser and a tank associated with said collecting tank for condensing and receiving the produced lighter hydrocarbons, substantially as described.

In testimony whereof I affix my signature.

CARL V. WOEGERER.